March 19, 1963  R. J. BERNOTAS  3,082,047
TRACK ROLLER ASSEMBLY
Filed May 15, 1961  2 Sheets-Sheet 1

INVENTOR.
Ralph J. Bernotas
BY
ATTORNEY

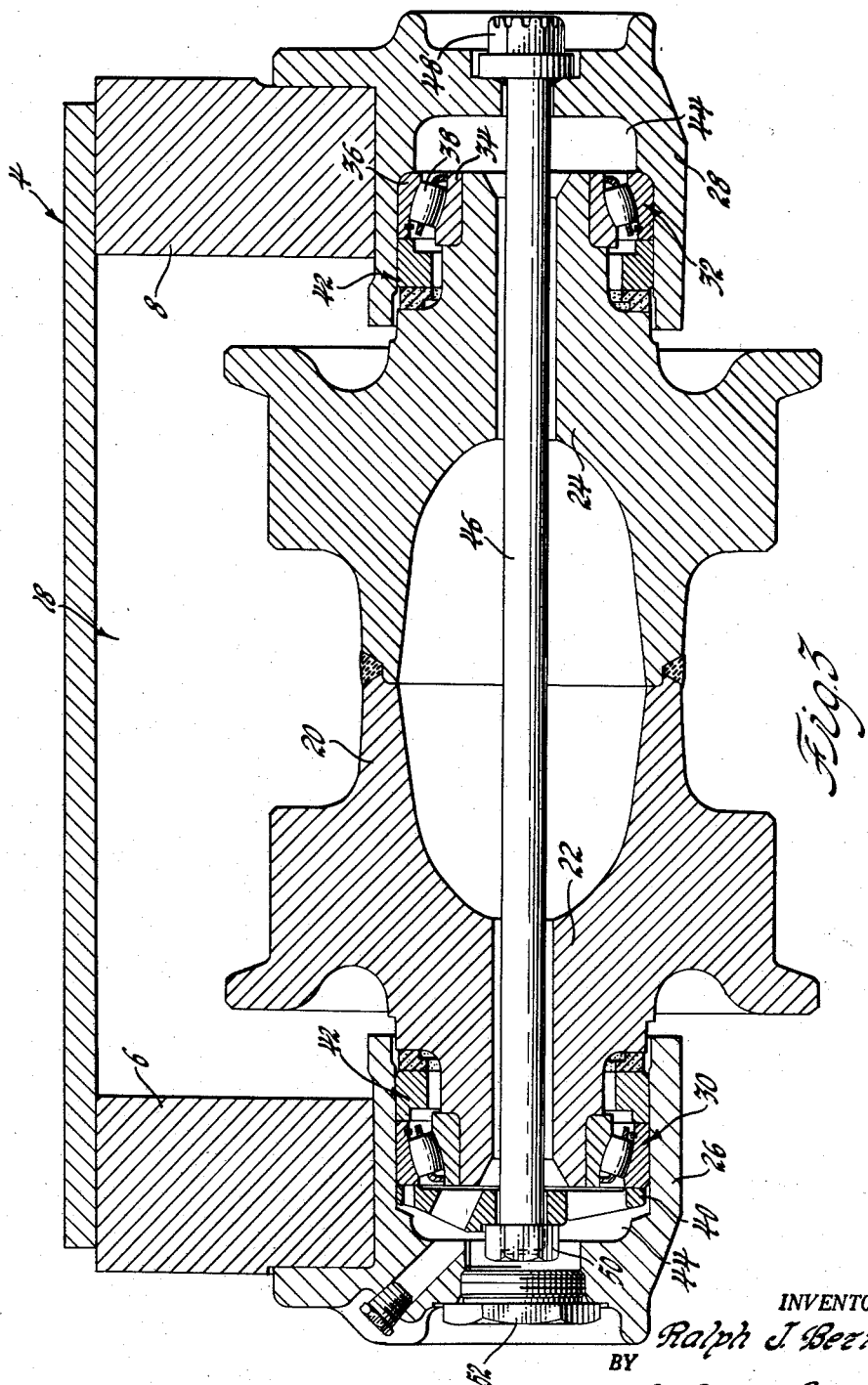

United States Patent Office 3,082,047
Patented Mar. 19, 1963

3,082,047
TRACK ROLLER ASSEMBLY
Ralph J. Bernotas, South Euclid, Ohio, assignor to General Motors Corporation, Detroit, Mich., a corporation of Delaware
Filed May 15, 1961, Ser. No. 109,890
14 Claims. (Cl. 308—211)

This invention pertains to load-bearing support assemblies for rotatably mounted members and, in particular, to track roller assemblies for tracked vehicles.

Tracked vehicles, such as crawler tractors, conventionally comprise a main tractor chassis and longitudinally extending track frames suitably connected to opposite sides thereof and supporting the endless tracks of the vehicle. Each track frame includes laterally spaced longitudinally extending frame members or rails. A plurality of track roller assemblies are mounted in longitudinally spaced relation along each track frame for rolling contact with the ground-engaging portion of the endless tracks of the vehicles, each roller assembly including a roller body rotatably supported from end caps or support members at the opposite ends thereof which are rigidly secured to respective frame members of the track frame.

As will be readily apparent to those acquainted with this art, the track roller assemblies of such vehicles are subjected repeatedly to extreme loads both axially and radially thereof, and particular attention must be given to the bearing assemblies which mount such rollers on their respective end caps or support members. Thus, and referring by way of example to a live shaft roller assembly which includes aligned stub axle shafts rotatably mounted by suitable bearing assemblies on the respective roller support members, particular care must be taken in properly preloading the bearing assemblies thereof to insure optimum transfer of loads from the roller to the track frame and otherwise obtain a substantial period of troublefree operation from the roller assemblies.

Consequently, in installing such roller assemblies on the track frame, whether at the factory or in the field, it has been conventional practice to utilize shim members in mounting the respective end caps or roller support members to the respective frame members of each track frame, the shims being utilized to properly position the support members axially relative to each other to provide the desired predetermined preload in the bearing assemblies. As will be apparent, such an installation procedure often involves gaging and regaging the preload and addition and removal of the shims at one or the other roller support members to obtain the desired preload. Needless to say, such a procedure is not very desirable in view of mass production techniques. However, and more importantly, such a procedure has been found to result in relatively great variation in the preload of the bearings of the roller assemblies on successive tractors coming from the same assembly line. Furthermore, the same problem is presented in the field and is accentuated when it is considered that such roller assemblies are often replaced by maintenance personnel who either lack the requisite experience or necessary equipment possessed by manufacturing personnel, or both, resulting in assembled track rollers having too loose or too tight a preload in their bearings.

Furthermore, even if the roller-supporting bearings are properly preloaded, the rather severe forces imposed on the track roller frame cause some relative bending or flexure of the respective frame members thereof thereby adversely affecting bearing loading; that is, these frame members of each track frame and the end caps or roller support members connected thereto have a tendency to move axially toward or away from each other resulting in substantial undesired changes in the loadings of the rollersupporting bearing assemblies.

It is, therefore, a principal object and feature of this invention to provide a roller assembly including bearing means which may be accurately preloaded prior to installation of the roller assembly, thereby insuring proper preload of the bearing means without further attention being given thereto upon installation of the roller assembly.

It is yet another object and feature of this invention to provide a roller assembly including a roller body having its opposite ends rotatably supported by bearing means disposed between the ends of the roller body and support members adapted to be or rigidly secured to suitable supports, one bearing means being fixed relative to its associated support member while the other bearing means is movable relative to its support member to accommodate relative movement between the support members.

It is yet another object and feature of this invention, with specific reference to a live shaft track roller assembly for a tracked vehicle, to provide such an assembly comprising a roller, an end cap or support member at each end of the roller adapted to be rigidly secured to the respective frame members of each track frame of the vehicle, load bearing assemblies disposed between and rotatably supporting each end of the roller within its associated end cap or support member, and means for adjusting the bearing assemblies axially relative to each other to adjust the preload on the bearing assemblies prior to installation of the roller assembly on the track vehicle.

It is yet another object and feature of this invention to provide a live shaft track roller of the type aforementioned which may not only be preloaded prior to installation on the tractor, but which further includes a bearing assembly at one end of the roller which is movably mounted relative to its associated end cap to compensate for relative flexure of the frame members of each track frame when the roller is installed thereon, thereby preventing extreme variations in the loadings of both bearing assemblies.

In general, these and other objects of the invention are attained in a track roller assembly comprising a roller including axially aligned axle shafts rigidly secured to and projecting axially from opposite ends or sides of the roller so as to be received respectively within end caps or support members. A roller bearing assembly surroundingly engages and rotatably supports each axle shaft within its associated end cap or support housing. The inner and outer races of one of the bearing assemblies are respectively secured to one shaft and its associated end cap, while the inner race of the other bearing assembly is rigidly secured to the other shaft and the outer race thereof is axially slidably mounted within the other end cap. A bearing cage is axially slidably disposed within this other end cap and engages the outer race of the bearing assembly therein so as to retain the latter. A rigid bolt extends between and interconnects the aforementioned cage and the oppositely located end cap on an axis coincident with the axis of rotation of the roller, and a nut is threadably adjustable on one end of the bolt to accomplish axial adjustment of the cage and opposite end cap relative to each other. As a consequence of this construction, the respective bearings may be adjusted axially relative to each other thereby preloading the bearing assemblies. Therefore, track roller assemblies including roller assemblies sold for the replacement market may be benched preloaded at the factory and irrespective of installation at the factory or in the field such roller assemblies may be mounted on the track frame of the vehicle merely by bolting or otherwise rigidly securing the end caps to the frame members of each track frame without further attention being given to the loading of the bearings. Finally, since the one end of the shaft including the bearing cage is axially slidably mounted within its associated end cap, relative flexure or bending of the track frame resulting in relative axial movement of the end caps will not affect to an undesired degree loading of the bearing.

The objects of the invention and the manner in which they are attained will become more apparent hereinafter as the description of the invention proceeds, and in which reference is made to the drawings in which:

FIGURE 3 is an enlarged view taken on line 3—3 of FIGURE 1.

At this juncture, and as will become more fully apparent hereinafter, the present invention may be usefully employed in many environments. However, for the purpose of illustrating and describing a preferred embodiment thereof, the drawings show and the following description is directed to a particular preferred use of the invention in conjunction with a crawler type vehicle.

Figure 1:
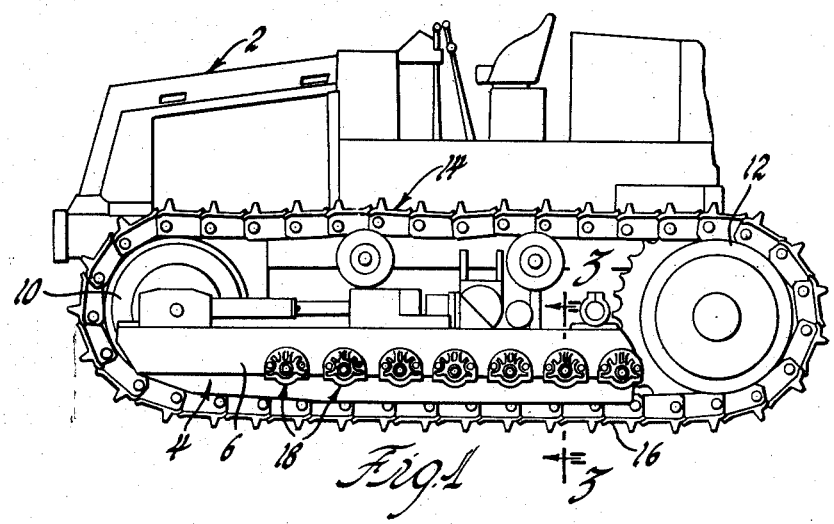
FIGURE 1 is a side elevational view of a crawler tractor equipped with a preferred embodiment of the invention.

Referring now to FIGURE 1 of the drawings, the crawler tractor 2 comprises the usual longitudinally extending track frame 4 on each side thereof, only that frame on the left side of the vehicle being shown, each track frame including rigidly interconnected laterally spaced longitudinally extending frame members or rails 6 and 8 (FIGURE 3). An idler wheel 10 is mounted at the forward end of each track frame, while a driving sprocket wheel 12 is mounted at the rear of the tractor and extends into substantial alignment with each of the respective track frames. A ground-engaging endless track 14 is entrained about the idler and sprocket wheels of each track frame, and the sprocket wheels are driven to propel the vehicle in a manner well known in this art. Inasmuch as the details of such a tractor vehicle form no part of the present invention and are well known in the art, further description of such details is deemed to be unnecessary. The ground-engaging portion 16 of each endless track intermediate the idler and sprocket wheels is engaged and supported by a plurality of live shaft track roller assemblies indicated generally at 18 and spaced longitudinally of each track frame 4.

Each roller assembly 18 comprises a roller body 20 having its periphery suitably flanged as indicated in FIGURE 3 so as to engage and guide the track links of the endles track in a manner well known in the art. Axially aligned stub axle shafts 22 and 24 are formed integral with or otherwise rigidly secured to opposite end faces of the roller body 20 and project axially therefrom. Each of these axle shafts projects into a respective hollow cylindrical end cap, housing or support 26 and 28, and anti-friction roller bearing assemblies 30 and 32 are respectively mounted between each axle shaft and its associated end cap in order to rotatably support the roller body about the axis of the axle shafts. Each of the bearing assemblies 30 and 32 comprises an annular inner race 34 and an oppositely disposed annular outer race 36 between which there are disposed a plurality of circumferentially spaced anti-friction roller bearing elements which, in this case, are barrel type roller bearing elements 38. Each of the bearing assemblies is adapted to absorb and transfer loads imposed on the roller both radially and axially thereof as will be apparent to those skilled in the art.

The inner race 34 of each bearing assembly is suitably rigidly secured as by press-fitting about the extreme outer end of a respective axle shaft, while the outer race 36 of the bearing assembly 32 is similarly secured within its associated end cap or housing 28. A bearing cage 40 is disposed within the end cap 26 and engages the axially outer end of the outer race of the bearing assembly 30 so as to retain the latter in operative relation with its associated inner race and bearing elements. Both the outer race of the bearing assembly 30 and its supporting cage 40 are free to move axially relative to the end cap 26. Suitable seal means indicated generally at 42 are interposed between the open end of each end cap and its associated axle shaft, a cavity 44 being provided between the end of each axle shaft and its associated end cap and adapted to be charged with a lubricant for the respective bearing assemblies.

A rigid bolt 46 extends axially through the roller 20 and axle shafts 22 and 24 coincident with the axis of rotation of the latter and includes a head 48 at one end thereof engaged with the exterior surface of end cap 28 and is threaded at the other end thereof to receive an adjustable nut 50 engaged with the exterior surface of the cage 40. A threaded plug 52 closes an opening in end cap 26 through which access may be had to nut 50.

Figure 2:
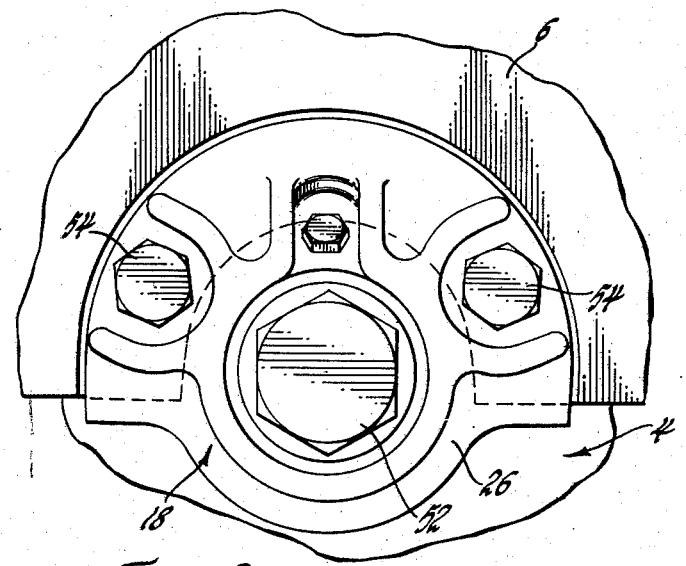
FIGURE 2 is an enlarged fragmentary view of a portion of FIGURE 1.

It will now be apparent that, in initially assembling the track roller 20, bearing assemblies 30 and 32 and the respective end caps 26 and 28 as shown in FIGURE 3, the bolt 46 is passed between the bearing cage 40 and the end cap 28 and nut 50 is adjusted to draw such cage and end cap axially toward each other to preload the bearing assembly, suitable gages and other devices being employed as required for this purpose. Thereafter, such assembled track rollers may be installed on a tractor at the factory or in the field without need for further attention to such preload. Thus, the end cap 26 is mounted about axel shaft 22 and the respective end caps or support structures 26 and 28 are suitably rigidly secured as by fasteners 54 (FIGURE 2) to the respective frame members 6 and 8 of each track frame 4 so as to dispose the rollers transversely between such frame members in engagement with the ground-engaging portion 16 of each track. While the end caps may be so secured in any suitable manner, preferably they are secured in downwardly opening semi-circular recesses in the track frames in the manner and for the purpose more fully described in United States Patent No. 2,823,079, entitled "Track Roller Assembly," and granted to R. C. Williams on February 11, 1958.

Finally, it will be noted that the aforedescribed construction avoids the imposition of substantial undesired changes in the loading of the bearing assemblies 30 and 32. Thus, as the track roller frames bend or flex in response to the relatively severe forces imposed thereon, the track frame members 6 and 8 will likewise flex relative to each other. However, since the bearing assembly 30 may "float" axially relative to the bore of the end cap 26, relative axial inward or outward movement of the end caps occasioned by relative flexure of the frame members 6 and 8 will have a relatively slight effect, if any, on the predetermined loadings of the bearing assemblies since the latter are confined between cage 40 and end cap 28 which are fixed relative to each other.

While but one form of the invention has been shown and described, other forms will now be apparent to those skilled in the art. Therefore, the embodiment shown on the drawing is merely for illustrative purposes, and is not intended to limit the scope of the invention which is defined by the claims which follow.

I claim:

1. A roller assembly comprising a roller including axially aligned axle shafts rigidly secured thereto and projecting from opposite ends thereof, a support member for each of said shafts, bearing means disposed between each of said support members and a respective shaft and rotatably supporting the latter, one of said bearing means being fixed axially relative to one of said support members, the other of said bearing means being movable axially relative to the other of said support members, and means for adjusting said other bearing means axially relative to said one support member and independently of said other support member to preload said bearing assemblies.

2. A roller assembly comprising a roller including axially aligned axle shafts rigidly secured thereto and projecting from opposite ends thereof, a support member for one of said shafts, bearing means disposed between said support member and said one shaft and rotatably supporting the latter, a bearing cage for the other of said shafts, bearing means disposed between said bearing cage and said other shaft and rotatably supporting the latter, axially adjustable means connecting said cage and said support member to position them axially relatively to each other to preload said bearing means, and a support member axially slidably supporting said other shaft and its associated bearing means.

3. A live shaft track roller assembly comprising a roller including axially aligned axle shafts rigidly secured thereto and extending from the opposite ends thereof, a support member for each of said shafts, a bearing assembly disposed between each of said support members and a respective shaft and rotatably supporting the latter, a bearing cage for the bearing assembly for one of said shafts, said cage and said one shaft including the bearing assembly disposed therebetween being movable axially relative to one of said support members, and axially adjustable means connecting said cage and the other of said support members to position them axially relative to each other to preload said bearing assemblies.

4. A roller assembly comprising a roller including axially aligned axle shafts rigidly secured thereto and projecting from opposite ends thereof, bearing means rotatably supporting each of said shafts, and end cap supporting one of said shafts and its bearing means, a bearing cage for retaining the bearing means for the other of said shafts, axially adjustable means connecting said cage and end cap to position them axially relative to each other to preload said bearing means, and an end cap supporting the other of said shafts, said last-named end cap and said other shaft including its bearing means being free to move axially relative to each other.

5. A roller assembly comprising a roller including axially aligned axle shafts rigidly secured thereto and projecting from opposite ends thereof, bearing means rotatably supporting each of said shafts, an end cap supporting one of said shafts and its associated bearing means, a bearing cage for retaining the bearing means for the other of said shafts, axially adjustable means including a bolt extending axially between and connecting said cage and end cap to position them axially relative to each other to preload said bearing means, and an end cap supporting the other of said shafts, said last-named end cap and said other shaft including its bearing means being free to move axially relative to each other.

6. A roller assembly comprising a roller including axially aligned axle shafts rigidly secured thereto and projecting from opposite ends thereof, a bearing assembly rotatably supporting each of said shafts, each of said assemblies including inner and outer annular races having a plurality of antifriction load bearing elements disposed therebetween, said inner race of each bearing assembly being secured about a respective shaft, an end cap receiving and supporting one of said shafts, the outer race of the bearing assembly for said one shaft being secured in said end cap, a bearing cage at the end of the other shaft, the outer race of the bearing assembly for said other shaft being retained by said cage, axially adjustable means connecting said cage and end cap to position them axially relative to each other to preload said bearing assemblies, and an end cap receiving and supporting the other of said shafts, said last-named end cap and said other shaft including its bearing assembly being free to move axially relative to each other.

7. A roller assembly comprising a roller including axially aligned axle shafts rigidly secured thereto and extending from the opposite ends thereof, an end cap receiving each of said shafts, first and second bearing assemblies each including inner and outer bearing races and a plurality of anti-friction bearing elements disposed therebetween, said inner races being respectively secured about said shafts, the outer race of said first bearing assembly being secured within one of said end caps and the outer race of said second bearing assembly being axially slidably mounted within the other of said end caps, a bearing cage axially slidably mounted within said other end cap and retaining the outer race of said second bearing assembly, and axially adjustable means connecting said cage and said one end cap to position them axially relative to each other to preload said bearing assemblies.

8. A track roller assembly adapted to be mounted on a track frame of a tracked vehicle comprising a track roller, axially aligned axle shafts rigidly secured to and projecting from opposite ends of said roller, a bearing assembly rotatably supporting each of said shafts, each of said assemblies including inner and outer annular races having a plurality of anti-friction load bearing elements disposed therebetween, said inner race of each bearing assembly being secured about a respective shaft, an end cap receiving and supporting one of said shafts, the outer race of the bearing assembly for said one shaft being secured in said end cap, a bearing cage at the end of the other shaft, the outer race of the bearing assembly for said other shaft being retained by said cage, axially adjustable means connecting said cage and end cap to position them axially relative to each other to preload said bearing assemblies, an end cap receiving and supporting the other of said shafts, said last-named end cap and said other shaft including its bearing assembly being free to move axially relative to each other, and means for rigidly mounting said end caps on a track frame to support said roller on the latter.

9. A live shaft track roller assembly adapted to be mounted on the track frame of a tracked vehicle comprising a roller including axially aligned axle shafts rigidly secured thereto and extending from the opposite ends thereof, an end cap receiving each of said shafts, first and second bearing assemblies each including inner and outer bearing races and a plurality of anti-friction bearing elements disposed therebetween, said inner races being respectively secured about said shafts, the outer race of said first bearing assembly being secured within one of said end caps and the outer race of said second bearing assembly being axially slidably mounted within the other of said end caps, a bearing cage axially slidably mounted within said other end cap and retaining the outer race of said second bearing assembly, axially adjustable means including a bolt extending between and connecting said cage and said one end cap on an axis coincident with the axis of rotation of said roller, said means being axially adjustable to position said cage and said one end cap axially relative to each other to preload said bearing assemblies, and means for rigidly mounting said end caps to a track frame to rotatably support the roller on the latter.

10. In combination, a tracked vehicle including a track frame having a pair of spaced frame members, a track-engaging roller assembly disposed between said frame members; said roller assembly comprising a pair of support members respectively rigidly secured to said frame members, a roller including axially aligned axle shafts rigidly secured thereto and projecting from opposite ends thereof, bearing means disposed between each of said support members and a respective shaft and rotatably supporting the latter, one of said bearing means being fixed axially relative to one of said support members, the other of said bearing means being axially movable relative to the other of said support members, and means for adjusting said other bearing means and said one support member axially relative to each other independently of said other support member to preload said bearing assemblies.

11. In combination, a tracked vehicle including a track frame having a pair of spaced frame members, a track-engaging roller assembly disposed between said frame members; said roller assembly comprising a pair of support members respectively rigidly secured to said frame members, a roller including axially aligned axle shafts rigidly secured thereto and projecting from opposite ends thereof, bearing means disposed between each support member and a respective shaft and rotatably supporting the latter, one of said bearing means being fixed axially relative to one of said support members, the other of said bearing means being movable axially relative to the other of said support members, a bearing cage for retaining the other of said bearing means, an axially adjustable means connecting said cage and said one support member to position them axially relative to each other to preload said bearing assemblies.

12. In combination, a tracked vehicle including a track frame having a pair of spaced frame members, a track-engaging roller assembly disposed between said frame members; said roller assembly comprising a pair of axially aligned end caps opening toward each other and respectively rigidly secured to said frame members, a roller including axially aligned axle shafts rigidly secured thereto and projecting from opposite ends thereof into a respective end cap, first and second bearing assemblies respectively rotatably supporting said shafts within said end caps and each including inner and outer bearing races and a plurality of anti-friction bearing elements disposed therebetween, the inner races of said bearing assemblies being secured about respective shafts, the outer race of said first bearing assembly being secured within one of said end caps and the outer race of said second bearing assembly being axially slidably disposed within the other of said end caps, a bearing cage axially slidably disposed within said other end cap and retaining the outer race of said second bearing assembly, an axially adjustable means including a bolt extending axially between and connecting said one end cap to the said cage in said other end cap to position them axially relative to each other to preload said bearing assemblies.

13. A roller assembly comprising a roller, a support member for each end of said roller, bearing means disposed between each of said support members and the respective end of said roller, one of said bearing means being fixed axially relative to one of said support members, the other of said bearing means being movable axially relative to the other of said support members, and means for adjusting said other bearing means axially relative to said one support member and independently of said other support member to preload said bearing assemblies.

14. A roller assembly comprising a roller, a support member for each end of said roller, bearing means disposed between said support member and one end of said roller, a bearing cage for the other end of the roller, bearing means disposed between the bearing cage and said other end of the roller, axially adjustable means connecting said cage and said support member to position them axially relatively to each other to preload said bearing means, and a support member axially slidably supporting said cage end of the roller.

References Cited in the file of this patent
UNITED STATES PATENTS

| | | |
|---|---|---|
| 2,690,933 | Bechman | Oct. 5, 1954 |
| 2,880,041 | Brownyer | Mar. 31, 1959 |